US012632857B2

(12) United States Patent
Ihara et al.

(10) Patent No.: US 12,632,857 B2
(45) Date of Patent: May 19, 2026

(54) MONEY PROCESSING DEVICE, METHOD OF RESOLVING ABNORMALITY OF MONEY PROCESSING DEVICE, AND COMPUTER-READABLE RECORDING MEDIUM

(71) Applicant: Glory Ltd., Himeji (JP)

(72) Inventors: Wataru Ihara, Hyogo (JP); Kazuya Nishino, Hyogo (JP)

(73) Assignee: GLORY LTD., Himeji (JP)

( * ) Notice: Subject to any disclaimer, the term of this patent is extended or adjusted under 35 U.S.C. 154(b) by 178 days.

(21) Appl. No.: 17/685,412

(22) Filed: Mar. 3, 2022

(65) Prior Publication Data

US 2022/0292494 A1 Sep. 15, 2022

(30) Foreign Application Priority Data

Mar. 12, 2021 (JP) ................................. 2021-040231

(51) Int. Cl.
*G06Q 20/38* (2012.01)
*G07F 19/00* (2006.01)

(52) U.S. Cl.
CPC ......... *G06Q 20/385* (2013.01); *G07F 19/209* (2013.01)

(58) Field of Classification Search
CPC .................................................. G06Q 20/385
USPC ......................................................... 705/44
See application file for complete search history.

(56) References Cited

U.S. PATENT DOCUMENTS 7,850,076 B1 * 12/2010 Dorenbaum ........... G07D 11/40
235/379
8,556,164 B1 * 10/2013 Freedman .......... G06Q 30/0207
235/487

9,361,608 B2 * 6/2016 Angus .................... G06Q 20/18
11,037,391 B1 * 6/2021 Alexander ............ G07F 19/202
11,461,754 B2 * 10/2022 Crooks .................... G07G 1/01
2008/0276098 A1 * 11/2008 Florencio ........... H04L 63/0838
713/183
2010/0258621 A1 * 10/2010 Schlabach .............. G06Q 10/06
340/5.82

(Continued)

FOREIGN PATENT DOCUMENTS

JP 2020-154588 A 9/2020
WO WO-2018042834 A1 * 3/2018 ............... G07D 9/00

OTHER PUBLICATIONS

"Shweta Sankhwar, A Safeguard against ATM fraud, 2016" (Year: 2016).*

*Primary Examiner* — Ryan D Donlon
*Assistant Examiner* — Gregory M James
(74) *Attorney, Agent, or Firm* — XSENSUS LLP

(57) ABSTRACT

A money processing device includes: a money processing unit; a communication circuitry; a man-machine interface; and processing circuitry configured to control the money processing unit, the communication circuitry and the man-machine interface. The processing circuitry generates temporary information, and operates the communication circuitry or the man-machine interface to provide the temporary information to outside. When the communication circuitry or the man-machine interface that is not operated to provide the temporary information to the outside receives secondary information corresponding to the temporary information, the processing circuitry transfers the money processing device to a state of executing a process of resolving an abnormality.

10 Claims, 13 Drawing Sheets

(56) References Cited

U.S. PATENT DOCUMENTS

| | | | |
|---|---|---|---|
| 2011/0011932 A1* | 1/2011 | Tsuyuki | G07G 1/01 235/383 |
| 2011/0125615 A1* | 5/2011 | Shirbabadi | G06Q 10/087 705/28 |
| 2011/0309137 A1* | 12/2011 | Votaw | G07F 9/002 235/375 |
| 2014/0143146 A1* | 5/2014 | Passanha | G06Q 20/385 705/44 |
| 2016/0358139 A1* | 12/2016 | Keys | G06Q 20/385 |
| 2019/0012453 A1* | 1/2019 | Priesterjahn | H04L 63/10 |
| 2020/0302726 A1 | 9/2020 | Sakamoto | |

* cited by examiner

1

MONEY PROCESSING DEVICE, METHOD OF RESOLVING ABNORMALITY OF MONEY PROCESSING DEVICE, AND COMPUTER-READABLE RECORDING MEDIUM

CROSS-REFERENCE TO RELATED APPLICATION

This application is entitled to (or claims) the benefit of Japanese Patent Application No. 2021-040231, filed on Mar. 12, 2021, the disclosure of which including the specification, drawings and abstract is incorporated herein by reference in its entirety.

TECHNICAL FIELD

The present disclosure relates to a money processing device, a method of resolving an abnormality of a money processing device and a computer-readable recording medium.

BACKGROUND ART

In the related art, various money processing devices are known. Abnormalities can be caused during an operation of a money processing device. When an abnormality is caused in a money processing device, the user has to resolve the abnormality to continue the operation.

SUMMARY

A money processing device according to the present disclosure includes: a money processing unit; a communication circuitry; a man-machine interface; and processing circuitry configured to control the money processing unit, the communication circuitry and the man-machine interface. The processing circuitry generates temporary information, and operates the communication circuitry or the man-machine interface to provide the temporary information to outside. When the communication circuitry or the man-machine interface that is not operated to provide the temporary information to the outside receives secondary information corresponding to the temporary information, the processing circuitry transfers the money processing device to a state of executing a process of resolving an abnormality.

2

Figure 7:
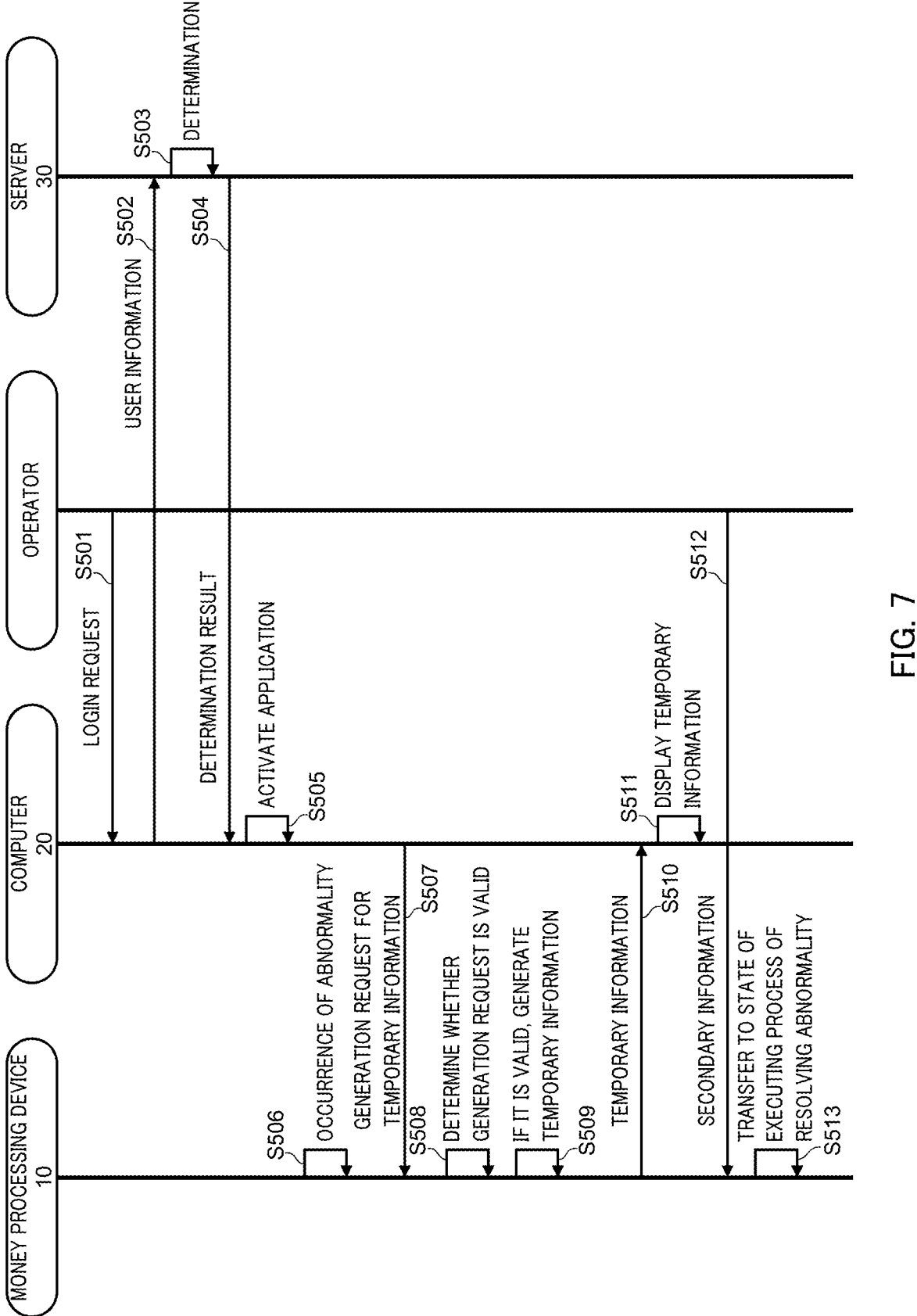
Figure 8:
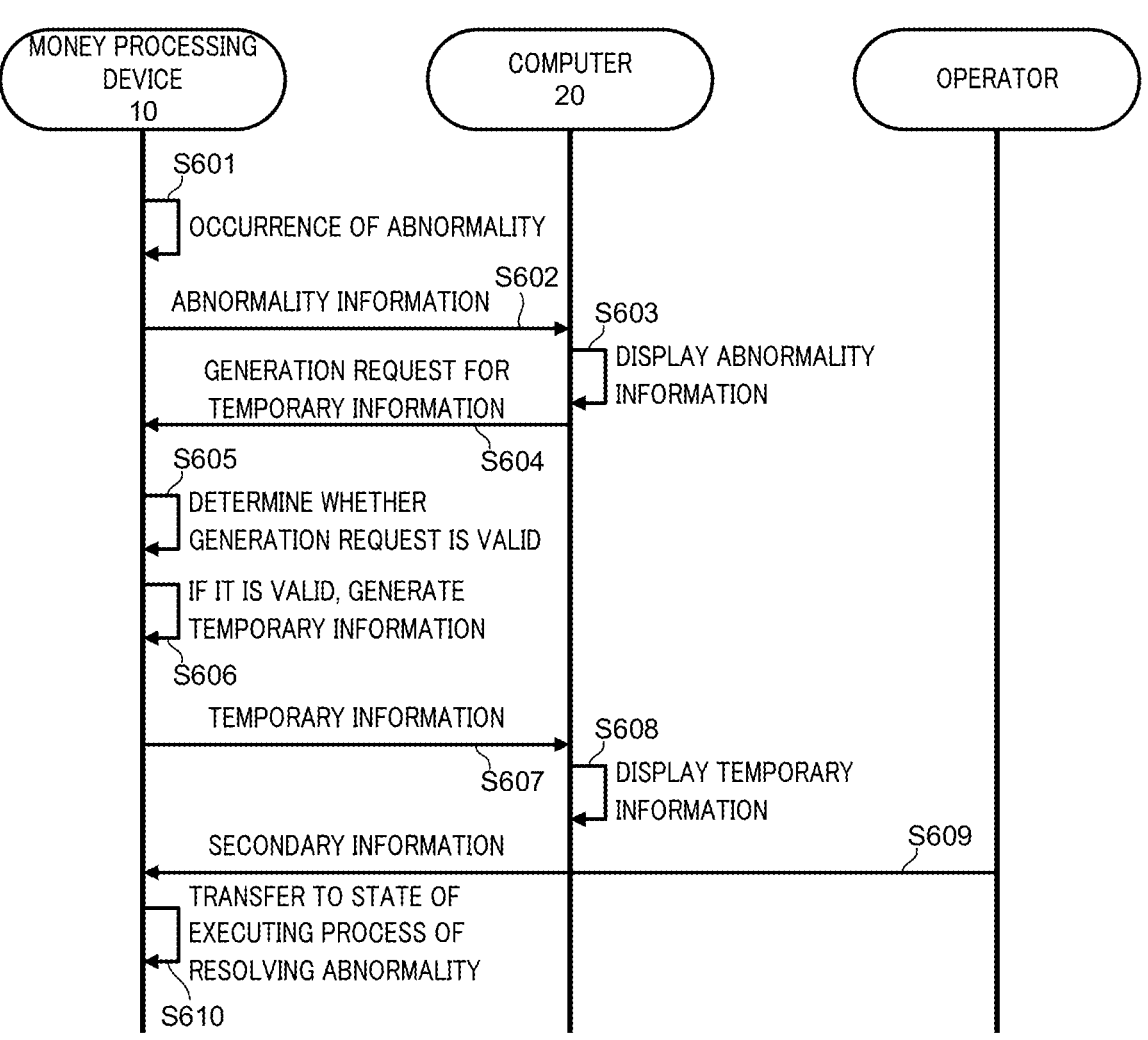
Figure 9:
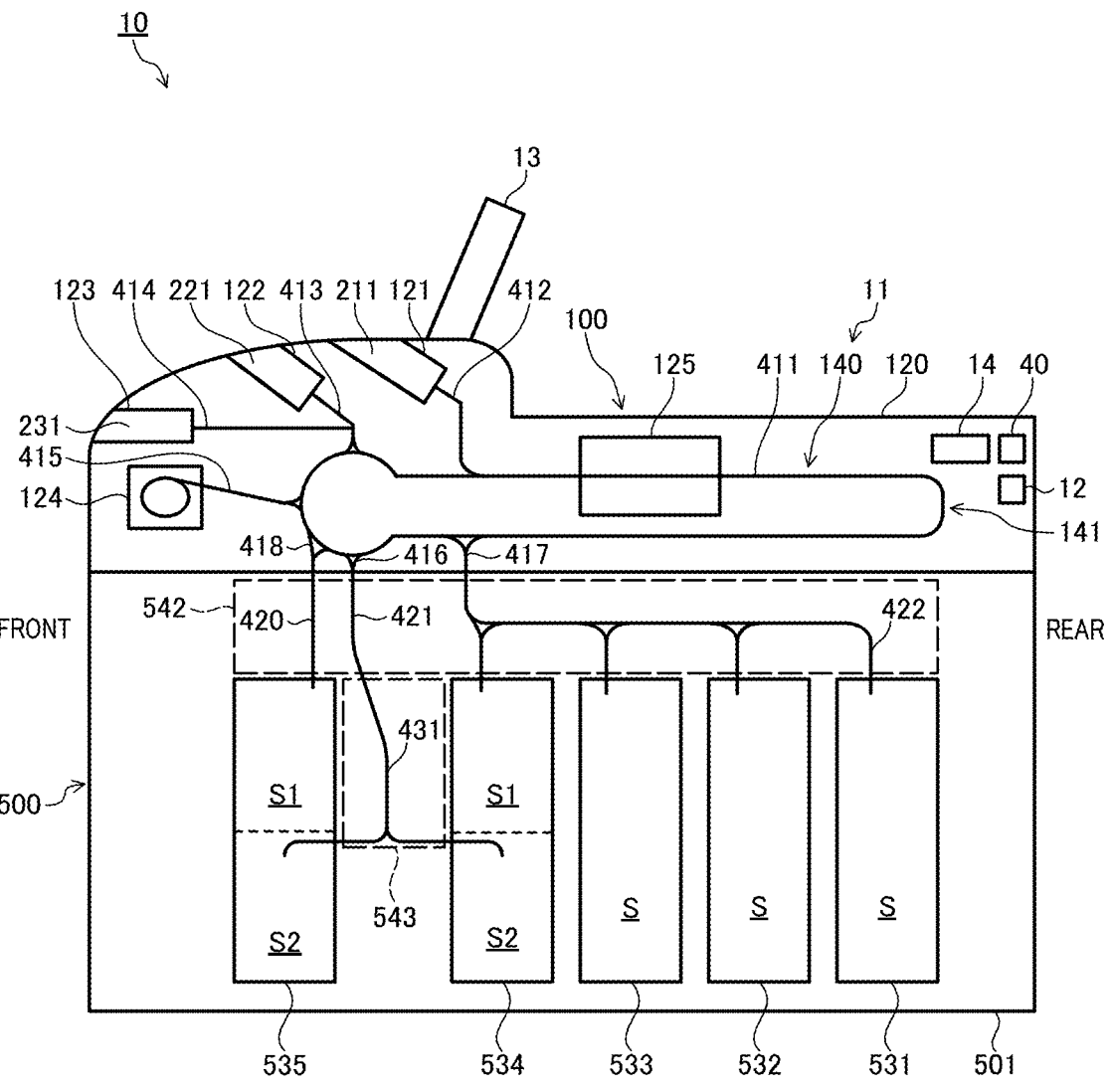
Figure 10:
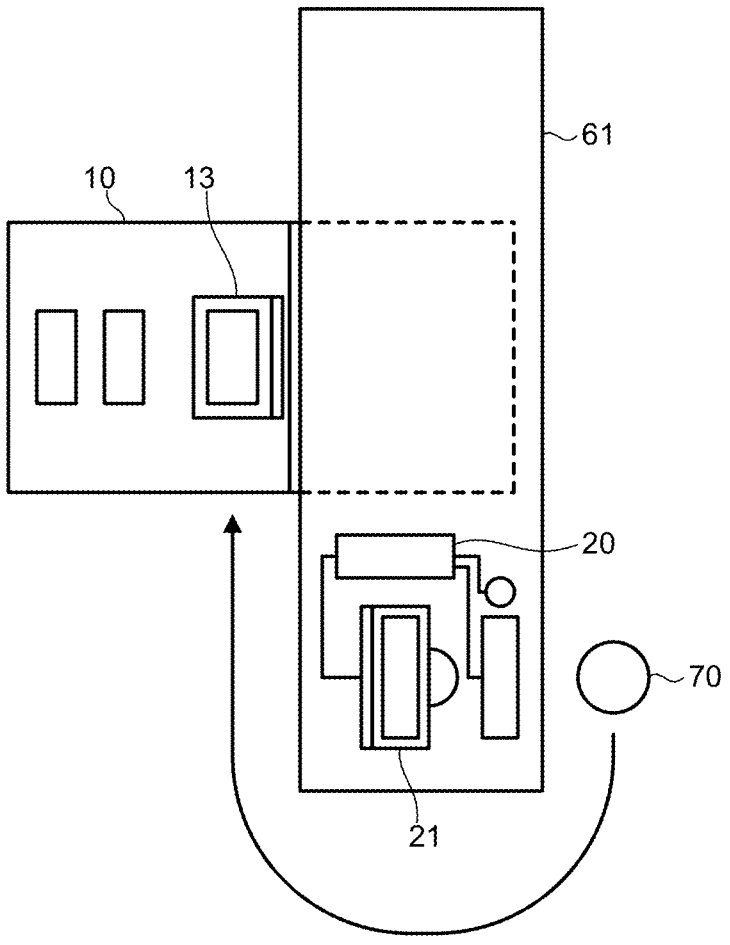
Figure 11:
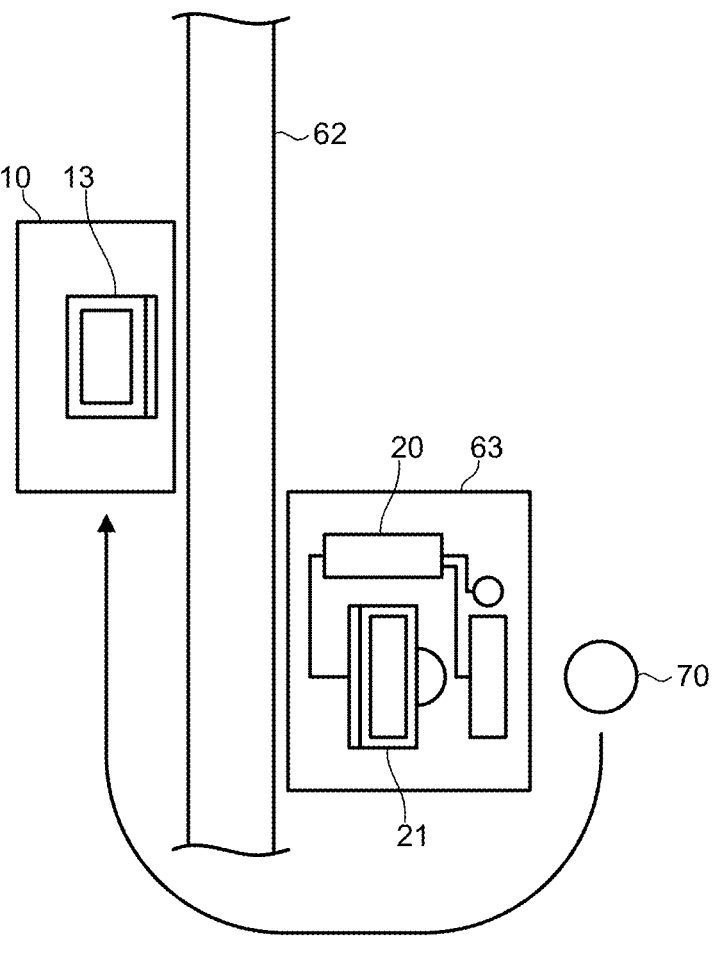
Figure 12:
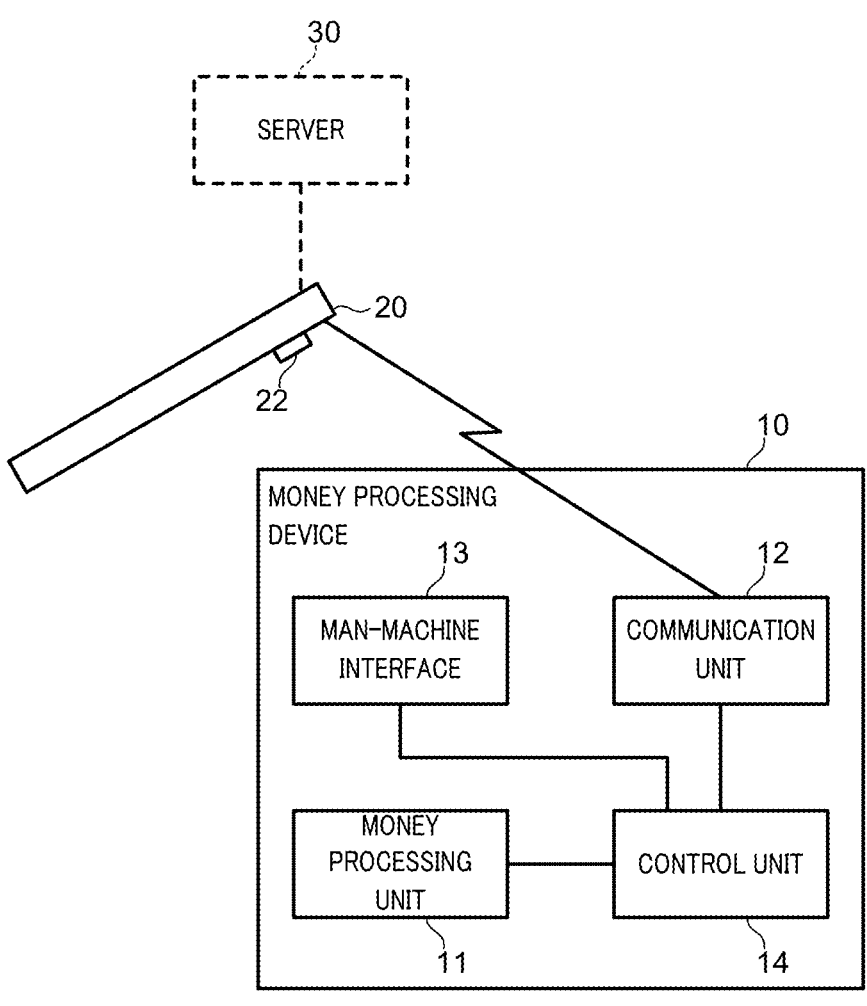
Figure 13:
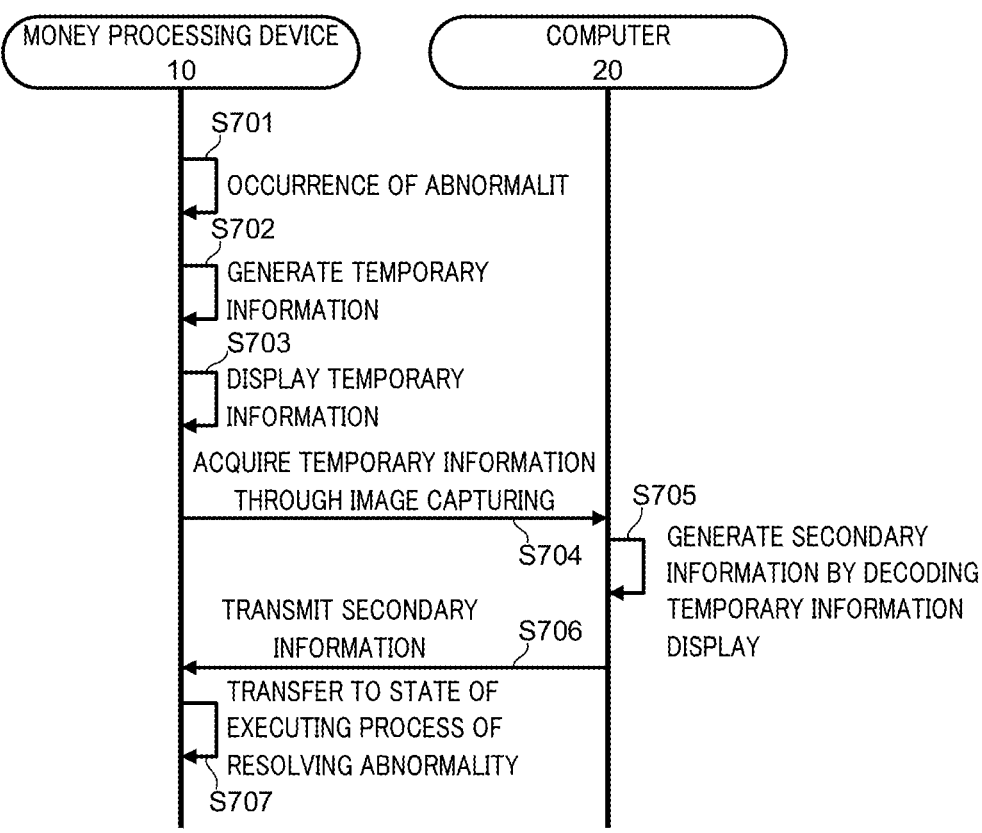

FIG. 7 is a sequence diagram illustrating another example of a method of resolving an abnormality of a money processing device according to Embodiment 2;

FIG. 8 is a sequence diagram illustrating another example of a method of resolving an abnormality of a money processing device according to Embodiment 2;

FIG. 9 is a schematic view of an example of a money processing device according to Embodiment 3;

FIG. 10 is a diagram illustrating an example of an installation state of a money processing device according to Embodiment 4;

FIG. 11 is a diagram illustrating an example of an installation state of a money processing device according to Embodiment 5;

FIG. 12 is a diagram illustrating a relationship between a money processing device and an upward processing device installed outside it according to Embodiment 6; and FIG. 13 is a sequence diagram illustrating an example of a method of resolving an abnormality of a money processing device according to Embodiment 6.

DESCRIPTION OF EMBODIMENTS

An object of the present disclosure is to provide a money processing device, a method of resolving an abnormality of a money processing device and a computer-readable recording medium that can appropriately resolve the abnormality when an abnormality is caused in a money processing device.

A money processing device according to the present disclosure includes: a money processing unit; a communication circuitry; a man-machine interface; and processing circuitry configured to control the money processing unit, the communication circuitry and the man-machine interface. The processing circuitry generates temporary information. The processing circuitry operates the communication circuitry to provide the temporary information to outside. The processing circuitry operates the man-machine interface to provide the temporary information to outside. Alternatively, when the communication circuitry is not operated to provide the temporary information to the outside and receives secondary information corresponding to the temporary information, the processing circuitry transfers the money processing device to a state of executing a process of resolving an abnormality. Alternatively, when the man-machine interface is not operated to provide the temporary information to the outside, and receives secondary information corresponding to the temporary information, the processing circuitry transfers the money processing device to a state of executing a process of resolving an abnormality. In the money processing device according to the present disclosure, the processing circuitry may operate the communication circuitry to provide the temporary information that is generated when the abnormality is caused at the money processing unit to an external computer; and the processing circuitry may transfer the money processing device to the state of executing the process of resolving the abnormality when the man-machine interface receives a password as the secondary information.

In the money processing device according to the present disclosure, the temporary information may be a one-time password; and the password may be the one-time password.

In the money processing device according to the present disclosure, the temporary information may be reference point designation information that designates a reference point of a variable password table prepared in advance. The password as the secondary information may be a variable password that is obtainable based on the variable password table and the reference point designation information.

In the money processing device according to the present disclosure, the processing circuitry may operate the man-machine interface to display the temporary information that is generated when the abnormality is caused at the money processing device; and when the communication circuitry receives the secondary information, the processing circuitry may transfer the money processing device to the state of executing the process of resolving the abnormality.

In the money processing device according to the present disclosure, the temporary information may be a bar code or a two-dimensional code. The secondary information may be information that is obtainable by decoding the bar code or the two-dimensional code.

In the money processing device according to the present disclosure, the processing circuitry may generate the temporary information when the abnormality is caused at the money processing unit.

In the money processing device according to the present disclosure, the processing circuitry may receive a request for generation of the temporary information through the communication circuitry and generate the temporary information. The processing circuitry may determine whether the generation request is valid; and when the generation request is determined to be valid, the processing circuitry may generate the temporary information.

In the money processing device according to the present disclosure, the processing circuitry may determine whether a computer communicatively connected through the communication circuitry has an authority to transmit the generation request; and when it is determined that the computer has the authority to transmit the generation request, the processing circuitry may determine that the generation request is valid.

In the money processing device according to the present disclosure, the processing circuitry may determine whether an application that is executed by a computer communicatively connected through the communication circuitry has an authority to transmit a generation request; and when it is determined that the application has the authority to transmit the generation request, the processing circuitry may determine that the generation request is valid.

In the money processing device according to the present disclosure, when the abnormality is caused, the processing circuitry may transmit an abnormality notification to the computer through the communication circuitry, the abnormality notification being information of notifying an occurrence of the abnormality.

In the money processing device according to the present disclosure, when the money processing device transfers to the state where the process of resolving the abnormality can be executed, the processing circuitry may display a guidance for resolving the abnormality on the man-machine interface.

In the money processing device according to the present disclosure, the money processing unit may include a dispensing unit, and when the money processing device executes the process of resolving the abnormality, the processing circuitry may control the money processing unit to dispense the money remaining inside the money processing unit.

A method according to the present disclosure is a method of resolving an abnormality of a money processing device, the money processing device including a money processing unit, a communication circuitry communicatively connected to a computer, a man-machine interface, and processing circuitry configured to control the money processing unit, the communication circuitry and the man-machine interface. The processing circuitry generates temporary information. The processing circuitry operates the communication circuitry to provide the temporary information to outside. Alternatively, the processing circuitry operates the man-machine interface to provide the temporary information to outside. When the communication circuitry is not operated to provide the temporary information to the outside and receives secondary information corresponding to the temporary information, the processing circuitry transfers the money processing device to a state of executing a process of resolving an abnormality. Alternatively, when the man-machine interface is not operated to provide the temporary information to the outside, and receives secondary information corresponding to the temporary information, the processing circuitry transfers the money processing device to a state of executing a process of resolving an abnormality.

In addition, in the method of resolving the abnormality of the money processing device according to the present disclosure, the processing circuitry may generate temporary information when an abnormality is caused at the money processing unit.

In the method of resolving the abnormality of the money processing device according to the present disclosure, the computer may transmit a request for generation of the temporary information to the communication circuitry; the processing circuitry may determine whether the generation request is valid; and when it is determined that the generation request is valid, the processing circuitry may generate the temporary information.

In the method of resolving the abnormality of the money processing device according to the present disclosure, the processing circuitry may determine whether the computer has an authority to transmit the generation request; and when it is determined that the computer has the authority to transmit the generation request, the processing circuitry determines that the generation request is valid.

In the method of resolving the abnormality of the money processing device according to the present disclosure, the processing circuitry may determine whether an application that is executed by the computer has an authority to transmit a generation request; and when it is determined that the application has the authority to transmit the generation request, the processing circuitry may determine that the generation request is valid.

In the method of resolving the abnormality of the money processing device according to the present disclosure, the computer may determine whether a user of the computer has an authority to transmit the generation request; and when it is determined that the user of the computer has the authority to transmit the generation request, the computer may activate an application used for transmitting the generation request to the communication circuitry.

In the method of resolving the abnormality of the money processing device according to the present disclosure, the computer may use a server to determine whether the user has an authority to transmit the generation request. The server manages data for authentication of a user of the computer. The computer transmits, to a server, user information, which is information related to the user. The server determines whether the user has an authority to transmit the generation request, based on the user information; and transmits a determination result to the computer. When the determination result means that the user has the authority to transmit the generation request, the computer may activate an application used for transmitting the generation request to the money processing device.

In addition, in the method of resolving the abnormality of the money processing device according to the present disclosure, when an abnormality is caused, the communication circuitry may transmit an abnormality notification, which is information of notifying an occurrence of an abnormality, to the computer.

In addition, in the method of resolving the abnormality of the money processing device according to the present disclosure, when the money processing device is transferred to the state where the process of resolving the abnormality can be executed, the processing circuitry may display a guidance for resolving the abnormality on the man-machine interface.

In addition, in the method of resolving the abnormality of the money processing device according to the present disclosure, when the process of resolving the abnormality is executed, the money processing device may dispense the money remaining inside the money processing device.

In the method of resolving the abnormality of the money processing device according to the present disclosure, the computer may be installed adjacent to the money processing device; and include a display that is installed such that a displayed content is not seen from an operator of the man-machine interface.

In the method of resolving the abnormality of the money processing device according to the present disclosure, the computer may include a display; the man-machine interface may be installed in a first space; the display may be installed in a second space adjacent to the first space; and a partition configured to limit free flow of a person may be installed between the first space and the second space.

In addition, in the method of resolving the abnormality of the money processing device according to the present disclosure, the processing circuitry operates the communication circuitry to provide the temporary information to the outside through communication, and the man-machine interface receives the password as the secondary information.

In addition, in the method of resolving the abnormality of the money processing device according to the present disclosure, the temporary information may be a one-time password. The password as the secondary information may be the one-time password.

In addition, in the method of resolving the abnormality of the money processing device according to the present disclosure, the temporary information may be reference point designation information for designating the reference point of a variable password table prepared in advance. The password as the secondary information may be a variable password that can be obtained based on a variable password table and reference point designation information.

In addition, in the method of resolving the abnormality of the money processing device according to the present disclosure, the processing circuitry operates the man-machine interface to provide the temporary information to the outside by displaying it on a screen, and the communication circuitry may receive the secondary information.

In addition, in the method of resolving the abnormality of the money processing device according to the present disclosure, the temporary information may be a bar code or a two-dimensional code. The secondary information may be information that can be obtained by decoding the bar code or the two-dimensional code.

A computer program according to the present disclosure is configured to be executed by a money processing device, the money processing device including a money processing unit, a communication circuitry communicatively connected to a computer, a man-machine interface, and processing circuitry configured to control the money processing unit, the communication circuitry and the man-machine interface; and when the computer program is executed, the processing circuitry generates temporary information, the processing circuitry operates the communication circuitry or the man-machine interface to provide the temporary information to outside, the communication circuitry or the man-machine interface that is not operated to provide the temporary information to the outside receives secondary information corresponding to the temporary information, and when the secondary information is received, the processing circuitry transfers the money processing device to a state of executing a process of resolving an abnormality.

In a computer-readable recording medium according to the present disclosure, the recording medium records a computer program configured to be executed by a money processing device, the money processing device including a money processing unit, a communication circuitry communicatively connected to a computer, a man-machine interface, and processing circuitry configured to control the money processing unit, the communication circuitry and the man-machine interface; and the money processing device reads the computer program from the recording medium and executes the computer program such that: the processing circuitry generates temporary information when an abnormality is caused at the money processing device, the processing circuitry operates the communication circuitry or the man-machine interface to provide the temporary information to outside, the communication circuitry or the man-machine interface that is not operated to provide the temporary information to the outside receives secondary information corresponding to the temporary information, and when the secondary information is received, the processing circuitry transfers the money processing device to a state of executing a process of resolving an abnormality.

The above-described means for solving the problems may be combined in various manners within the scope of the present disclosure.

According to the present disclosure, it is possible to provide a money processing device, a method of resolving an abnormality of a money processing device and a computer-readable recording medium that can appropriately resolve the abnormality when an abnormality is caused in a money processing device.

Embodiment 1

Figure 1:
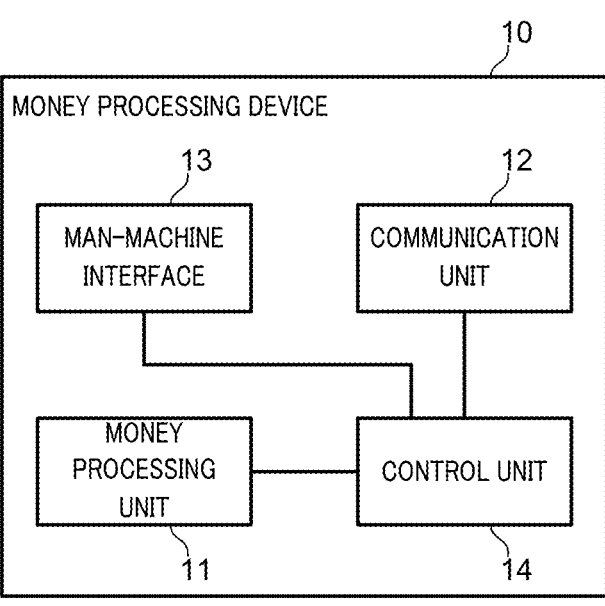
FIG. 1 is a schematic view of a money processing device according to Embodiment 1.

FIG. 1 is a schematic view of a money processing device 10 according to Embodiment 1. The money processing device 10 is a device installed in a facility such as a store of a financial institution (hereinafter referred to as financial store) such as a bank or a distribution store such as convenience store, and processes at least one of banknote and coin. Specific examples include a banknote coin depositing machine, a banknote coin depositing and dispensing machine, an automatic teller machine, a tax payment machine, a money changer, a ticket vending machine, a vending machine, a change machine, a banknote recycler and an electronic money charging machine.

The money processing device 10 includes a money processing unit 11, a communication unit 12, a man-machine interface 13 and a control unit 14.

The money processing unit 11 is a mechanical component that performs money processing performed by the money processing device 10. The specific configuration of the money processing unit 11 and the details of the process performed by the money processing unit 11 differ depending on the type of the money processing device 10. The money processing unit 11 may be, for example, a cash acceptor including a depositing inlet that receives cash, a transport member that forms a transport path to transport cash, a recognition circuitry that is configured to recognize cash, and a storage that stores cash. The money processing unit 11 may be a cash dispenser including a dispensing outlet from which cash is dispensed, in place of the depositing inlet. The money processing unit 11 may include both the depositing inlet and the dispensing outlet. For example, the money processing unit 11 may be an automatic teller machine.

The communication unit 12 is a mechanical element configured such that the money processing device 10 can communicate with an information processing device (e.g., a computer) other than (i.e., outside) the money processing device 10. The communication unit 12 may include a semiconductor chip that manages a network interface card or a network interface, for example. The communication unit 12 may be configured to make wired communication or radio communication with an external information processing device.

The man-machine interface 13 is a mechanical component configured to receive an operation of providing an instruction to the money processing device 10 by the user of the money processing device 10. The man-machine interface 13 may be a mechanical component configured such that the money processing device 10 provides information to the user of the money processing device 10. The man-machine interface 13 may be composed of a display unit such as a display and a lamp, for example. In addition, the man-machine interface 13 may be composed of an input receiving unit such as a button and an encrypting PIN pad (EPP). In addition, the man-machine interface 13 may be composed of a combination of a display unit and an input reception unit. In addition, the man-machine interface 13 may be composed of a touch panel with functions of a display unit and an input reception unit. Further, the man-machine interface 13 may include a voice output unit such as a speaker and a buzzer, or a voice input unit such as a microphone. The man-machine interface 13 according to the present embodiment includes a touch panel.

The control unit 14 is a processing circuitry, and is a hardware including a computation device such as a central processing unit (CPU) and a recording device that records data such as a program. Specific examples of the recording device may include a semiconductor memory such as a read only memory (ROM), a random access memory (RAM) and a solid state drive (SSD), and a recording medium such as a hard disk drive (HDD). The control unit 14 is configured to perform various operations when the computation device executes a program recorded in a recording device. The control unit 14 controls the money processing unit 11, the communication unit 12 and the man-machine interface 13.

When money is processed in the money processing device 10 with the above-described configuration, various abnormalities may be caused in the money processing unit 11 that actually processes money. For example, clogging with money, defects of the machine, and consumption of consumables that require periodical replenishment or replacement may be caused. When such abnormalities are caused, a method of resolving an abnormality described below is performed in the money processing device 10 according to the present embodiment.

Figure 2:
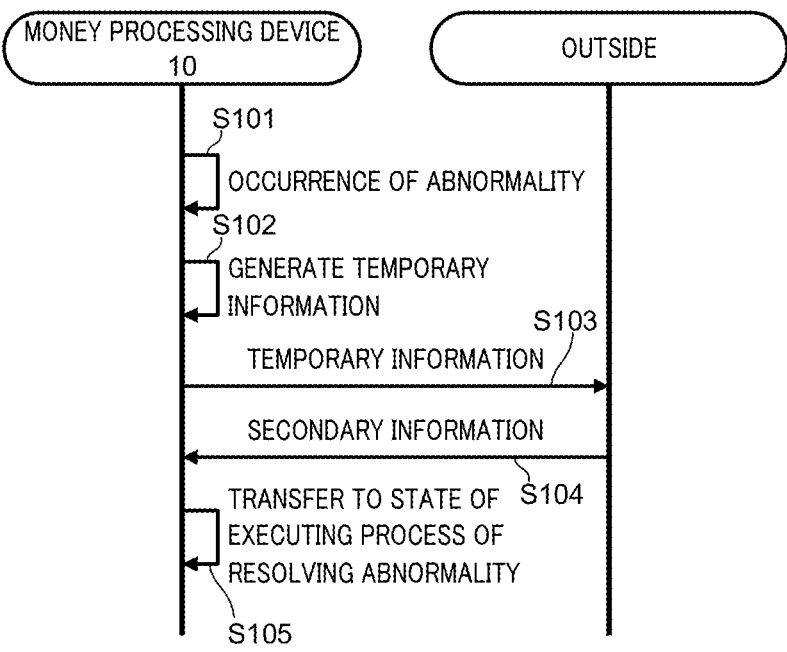
FIG. 2 is a sequence diagram illustrating an example of a method of resolving an abnormality of a money processing device according to Embodiment 1.

FIG. 2 is a sequence diagram illustrating an example of a method of resolving an abnormality of the money processing device 10 according to Embodiment 1.

For example, when an abnormality is caused at the money processing unit 11 (S101), the control unit 14 generates temporary information (S102). The temporary information is information that is effective for only one time, or for only a predetermined relatively short period. The condition for generating the temporary information is not limited to the occurrence of abnormalities. As described later, the temporary information may be generated by a condition of a request for generation of the temporary information from the outside. In addition, the temporary information may be generated by a condition of both an occurrence of an abnormality and a generation request.

The control unit 14 operates the communication unit 12 or the man-machine interface 13 to provide the generated temporary information to the outside (S103). When the communication unit 12 operates, the temporary information is transmitted to an external computer as electronic information by the communication unit 12. When the man-machine interface 13 operates, the temporary information is displayed as a character string or an image on a touch panel as a display unit.

Thereafter, the communication unit 12 or the man-machine interface 13 that is not operated to provide the temporary information to the outside receives secondary information corresponding to the temporary information from the outside (S104). When the communication unit 12 operates to provide the temporary information to the outside, the man-machine interface 13 receives the secondary information. When the man-machine interface 13 operates to provide the temporary information to the outside, the communication unit 12 receives the secondary information.

The secondary information is information corresponding to the temporary information in a one-to-one correspondence. The secondary information may be the temporary information itself, information obtained by transforming the temporary information by a predetermined information process, or information preliminarily set in association with temporary information in a one-to-one correspondence. As with the temporary information, the secondary information is effective for only one time, or for only a predetermined relatively short period.

When the man-machine interface 13 receives the secondary information, the reception of the secondary information can be performed through an input of letters to a touch panel (e.g., an input of a password corresponding to the temporary information). In addition, the reception of the secondary information can be performed through an operation of selecting an option (corresponding to the secondary information) corresponding to the temporary information from among a plurality of options displayed on a touch panel. For example, in the case where the temporary information includes a character string "cat", and an image of a dog and an image of a cat are displayed on the touch panel, a touch on the image of a cat is the reception of the secondary information.

When the communication unit 12 receives the secondary information, the reception of the secondary information can be performed through reception of the secondary information as electronic information sent from an external computer.

In the case where the secondary information is received and the received secondary information is information corresponding to the temporary information generated at S102, the control unit 14 transfers the money processing device 10 to the state of executing a process of resolving the abnormality caused at the money processing unit 11 (S105). Note that in the case where the received secondary information generated at S102 is information that does not correspond to the temporary information, the control unit 14 does not transfer the money processing device 10 to the state of executing the process of resolving the abnormality.

The money processing device 10 according to the present embodiment is configured as described above, and the method of resolving an abnormality caused at the money processing device 10 is performed as described above. That is, to resolve an abnormality, it is necessary for the user to acquire the temporary information from one of the communication unit 12 and the man-machine interface 13, and input the secondary information from the communication unit 12 or the man-machine interface 13 that is different from the acquisition source of the temporary information. That is, only a person who can access both the acquisition means of the temporary information and the input means of the secondary information can perform the operation for resolving the abnormality. For example, a person with no authority, such as customers in the facility where the money processing device 10 is installed, cannot access the acquisition means of the temporary information. In this manner, it is possible to prevent a situation where when an abnormality is caused at the money processing device 10, a person with no authority performs the operation of resolving the abnormality of the money processing device 10.

In addition, without preliminarily performing an operation of retaining information, such as a combination of a user ID and a password, required for resolving the abnormality caused at the money processing device 10 in the control unit 14, only a specific person can perform the operation of resolving the abnormality. In other words, the person who can access both the acquisition means of the temporary information and the input means of the secondary information can resolve the abnormality of the money processing device 10 even when an operation of retaining information required for resolving the abnormality in the control unit 14 is not performed in advance. The greater the number of the money processing devices 10 to be managed, the greater the load of the operation of retaining the information required for resolving the abnormality. In addition, when the password required for resolving the abnormality is changed, the load of the operation is further increased. With the money processing device 10 and the and abnormality resolving method according to the present embodiment, such an operation is unnecessary. Thus, the money processing device 10 can be more efficiently operated.

Embodiment 2

Figure 3:
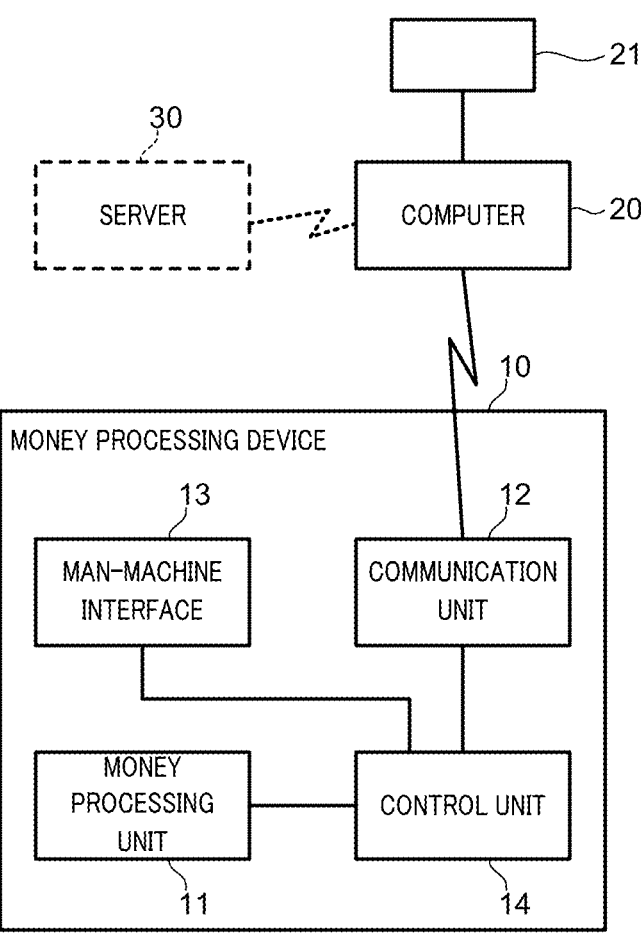
FIG. 3 is a diagram illustrating a relationship between a money processing device and an information processing device installed outside it according to Embodiment 2.

FIG. 3 is a diagram illustrating an example of a relationship between the money processing device 10 and an information processing device installed outside the money processing device 10 according to Embodiment 2. Points different from Embodiment 1 are mainly described below, and the descriptions of configurations, operations or effects similar to those of Embodiment 1 may be omitted.

The money processing device 10 according to the present embodiment is configured such that the communication unit 12 provides, i.e., transmits, temporary information to an external computer 20. In addition, the money processing device 10 according to the present embodiment is configured such that the man-machine interface 13 receives a password as the secondary information.

The computer 20 is configured to communicate with the communication unit 12. The computer 20 includes a display 21. The computer 20 may be an actual control device of the money processing device 10 that provides various instructions related to money processing to the money processing device 10, for example. In the case where the money processing device 10 is a money recycler installed in a financial store, the computer 20 may be an operation terminal (so-called teller terminal) operated by a bank clerk. In addition, in the case where the money processing device 10 is a change machine installed in a distribution store, the computer 20 may be a point of sales (POS) terminal operated by a salesclerk.

A server 30 may be a transaction management server, or a server that determines whether a login request made by the operator of the computer 20 is valid, as elaborated later. The transaction management server is, for example, a core banking server that manages bank account, and a store server that manages sales and inventory by collecting and analyzing data related to transaction processed at a POS of a distribution store. In addition, the server 30 may be a server that manages a plurality of financial stores or distribution stores. Note that the computer 20 may not be connected to the server 30.

Figure 4:
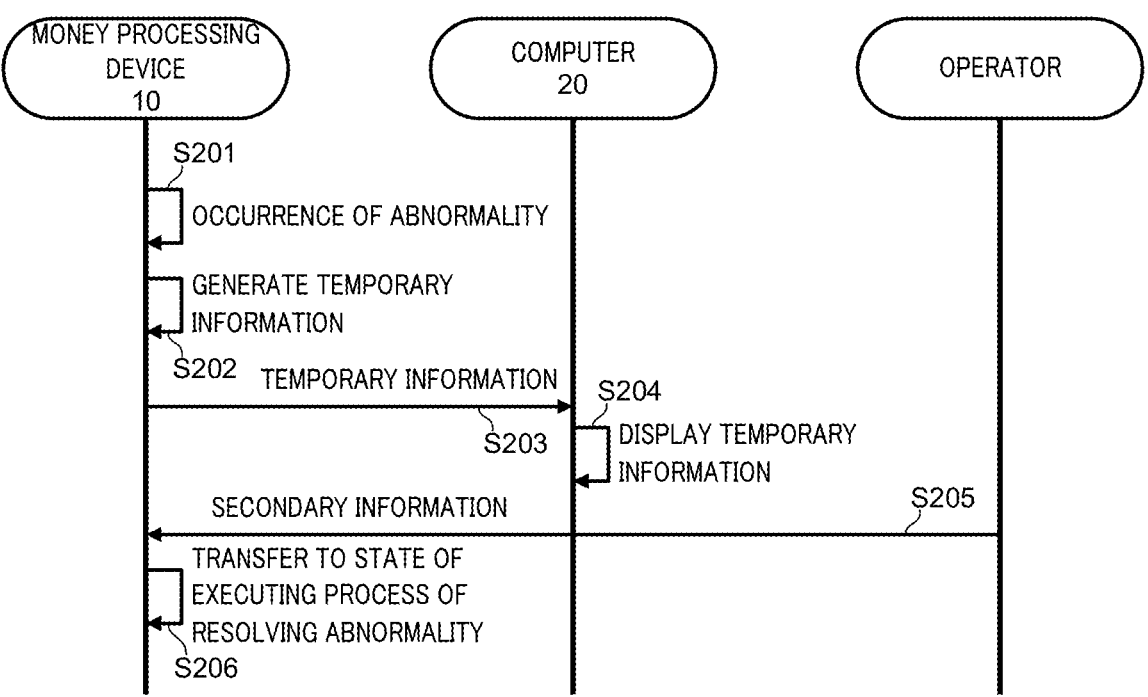
FIG. 4 is a sequence diagram illustrating another example of a method of resolving an abnormality of a money processing device according to Embodiment 2.

FIG. 4 is a sequence diagram illustrating an example of a method of resolving an abnormality of the money processing device 10 according to Embodiment 2.

When an abnormality is caused at the money processing unit 11 (S201), the control unit 14 automatically generates temporary information (S202). The condition for generating the temporary information is not limited to the occurrence of abnormalities. As described later, the temporary information may be generated by a condition of a request for generation of the temporary information from the outside. In addition, the temporary information may be generated by a condition of both occurrence of an abnormality and a generation request.

The control unit 14 operates the communication unit 12 to transmit the generated temporary information to the external computer 20 as electronic information (S203). The temporary information is a one-time password. The one-time password is composed of a predetermined number of random character strings (i.e., random combinations of letters, numbers and symbols). The one-time password is a password that is effective for only one time. That is, the one-time password is a password that cannot be used again after it is once used. The control unit 14 generates a different one-time password each time an abnormality is caused at the money processing unit 11.

The temporary information may be reference point designation information for designating the reference point of a variable password table prepared in advance. In this case, the variable password table is printed in advance on a card carried by the operator of the computer 20 (e.g., a bank clerk or a salesclerk). The variable password table is, for example, a table in which ten numbers from 0 to 9 are aligned in a random order. In the case where the variable password table is "9, 8, 7, 6, 5, 4, 3, 2, 1, 0", and the reference point designation information is information designating the third and fourth numbers from left, the variable password that can be obtained based on the variable password table and the reference point designation information is "7, 6". Each time an abnormality is caused at the money processing unit 11, the control unit 14 generates different reference point designation information.

When the computer 20 receives temporary information, the computer 20 causes the display 21 to display the temporary information (S204). The operator of the computer 20 (e.g., a bank clerk or a salesclerk) can recognize the temporary information generated according to the abnormality of this time by seeing the temporary information displayed on the display 21.

After moving from a position where the operator can see the display 21 to a position where the operator can operate the man-machine interface 13, the operator of the computer 20 inputs the password as the secondary information through the man-machine interface 13. That is, the man-machine interface 13 receives the password as the secondary information (S205). Note that the screen displayed on the man-machine interface 13 to receive the password may be automatically displayed together with the occurrence of abnormalities, or may be displayed when the operator moved closer to the man-machine interface 13 operates the man-machine interface 13.

The password received by the man-machine interface 13 is a one-time password displayed on the display 21. In the case where the temporary information is reference point designation information, the password received by the man-machine interface 13 is a variable password that can be obtained based on a variable password table prepared in advance and reference point designation information.

In the case where the received secondary information (password) corresponds to the temporary information generated at S202, the control unit 14 transfers the money processing device 10 to the state of executing the process of resolving the abnormality caused at the money processing unit 11 (S206). In the case where the received secondary information does not correspond to the temporary information generated at S202, the control unit 14 does not transfer the money processing device 10 to the state of executing the process of resolving the abnormality caused at the money processing unit 11.

The money processing device 10 according to the present embodiment is configured as described above, and the method of resolving an abnormality caused at the money processing device 10 is performed as described above. Specifically, to resolve an abnormality, it is necessary to acquire the temporary information by seeing the display 21 provided in the computer 20 located outside the money processing device 10, and input a password through the man-machine interface 13 provided in the money processing device 10. That is, only the operator of the computer 20 can perform the operation for resolving the abnormality. Thus, it is possible to prevent a situation where when an abnormality is caused at the money processing device 10, a person with no authority performs the operation of resolving the abnormality of the money processing device 10. Examples of a person with no authority may include customers in the facility where the money processing device 10 is installed, and workers in the facility with no authority to operate the computer 20 (e.g., a bank clerk or a salesclerk).

In addition, when an abnormality is caused, the control unit 14 may automatically generate the temporary information, and the communication unit 12 may transmit the temporary information to the computer 20. In this case, the operator of the computer 20 can immediately recognize the occurrence of an abnormality at the money processing device 10 and immediately start an operation for resolving the abnormality.

Note that one money processing device 10 may be connected to one computer 20, or to a plurality of computers 20. In addition, one computer 20 may be connected to a plurality of the money processing devices 10.

Modification 1 of Embodiment 2

Further, abnormalities caused in the money processing device 10 according to the present embodiment may be resolved in the following manner.

Figure 5:
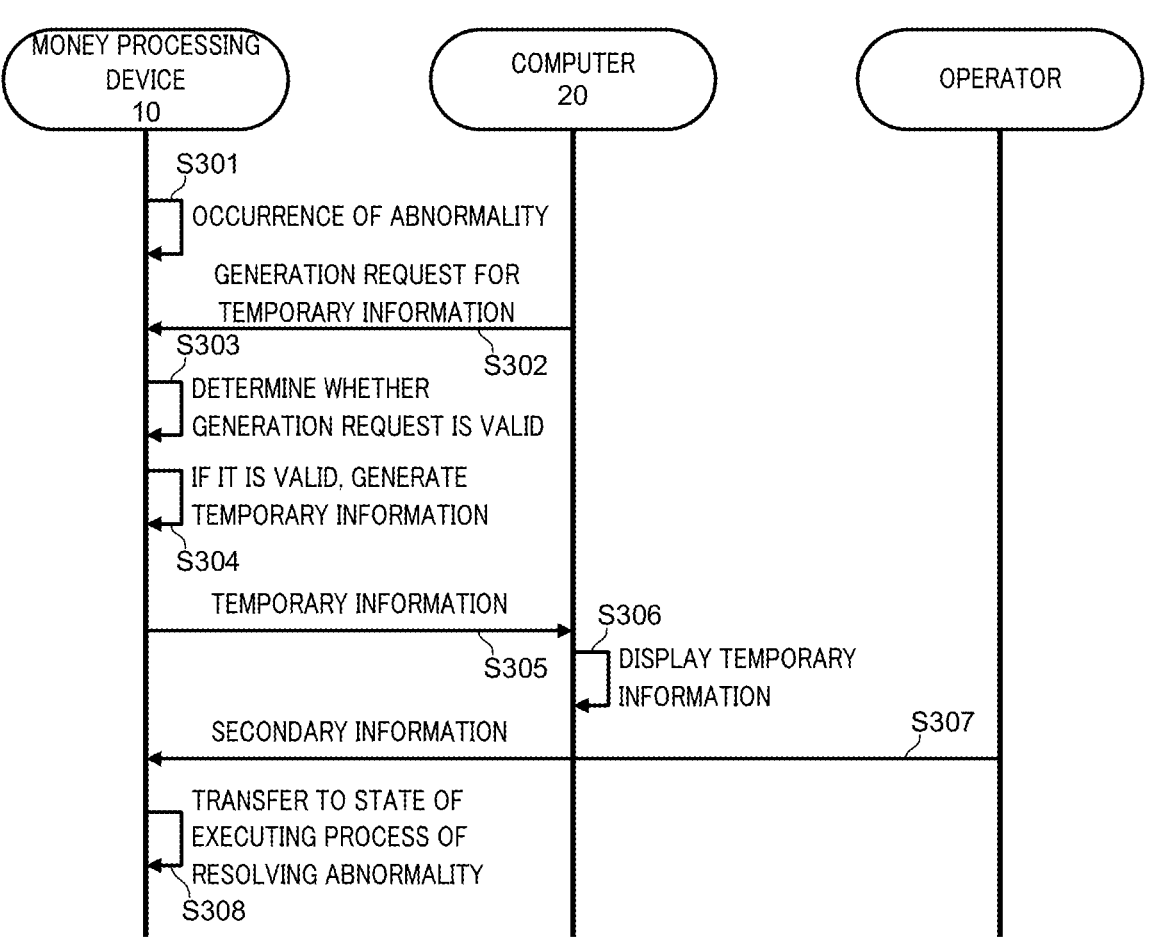
FIG. 5 is a sequence diagram illustrating another example of a method of resolving an abnormality of a money processing device according to Embodiment 2.

FIG. 5 is a sequence diagram illustrating another example of a method of resolving an abnormality of the money processing device 10 according to Embodiment 2.

When an abnormality is caused at the money processing unit 11 (S301), the operator of the computer 20 operates the computer 20 to transmit a signal of a request for generation of temporary information. Note that the operator of the computer 20 can notice the occurrence of an abnormality at the money processing unit 11, i.e., the money processing device 10 by means other than information communication between the money processing device 10 and the computer 20. Examples of the means other than information communication between the money processing device 10 and the computer 20 may include a contact from a person who has used the money processing device 10, a sound for notifying an abnormality output from the money processing device 10, lighting of a lamp provided in the money processing device 10, and a change of a display of the man-machine interface 13. Note that a signal of a request for generation of temporary information may be transmitted regardless of the presence/absence of an abnormality of the money processing unit 11.

A request for generation of temporary information sent by the computer 20 is received by the communication unit 12 (S302).

Then, the control unit 14 determines whether the received generation request is valid (S303). The determination of whether the received generation request is valid can be achieved by determining whether the computer 20 has the authority to transmit a generation request. For example, recognition information (e.g., an authentication key) inherent in the computer 20 from the computer 20 is received, and whether the received recognition information is recorded as recognition information of a computer with the authority in the recording device provided in the control unit 14 is checked. When it is recorded, it is possible to determine that the computer 20 has the authority to transmit a generation request.

In addition, the determination of whether the received generation request is valid may be achieved by determining whether the application executed by the computer 20 has the authority to transmit a generation request. For example, recognition information (e.g., an authentication key) inherent in the application executed by the computer 20 is received from the computer 20, and whether the received recognition information is recorded in the recording device provided in the control unit 14 as recognition information of an application with the authority is checked. When it is recorded, it is possible to determine that the application executed by the computer 20 has the authority.

The determination whether the received generation request is valid, i.e., the authentication of the computer 20 or the application may be achieved by publicly known techniques using digital signature and digital certificate.

When it is determined that the received generation request is valid, the control unit 14 generates the temporary information (S304). When the received generation request is not valid, i.e., when the request for generation of temporary information is made by a person with no valid authority, the temporary information is not generated. Thus, it is possible to prevent a situation where an operation for resolving the abnormality is performed by a person with no valid authority.

The flow after the generation of the temporary information (S305 to S308) is the same as the flow (S203 to S206) of the processing method described above with reference to FIG. 4.

With this abnormality resolving method, a situation where a person with no valid authority performs an operation of resolving the abnormality caused at the money processing device 10 can be more reliably prevented.

Modification 2 of Embodiment 2

Further, abnormalities caused in the money processing device 10 according to the present embodiment may be resolved in the following manner.

Figure 6:
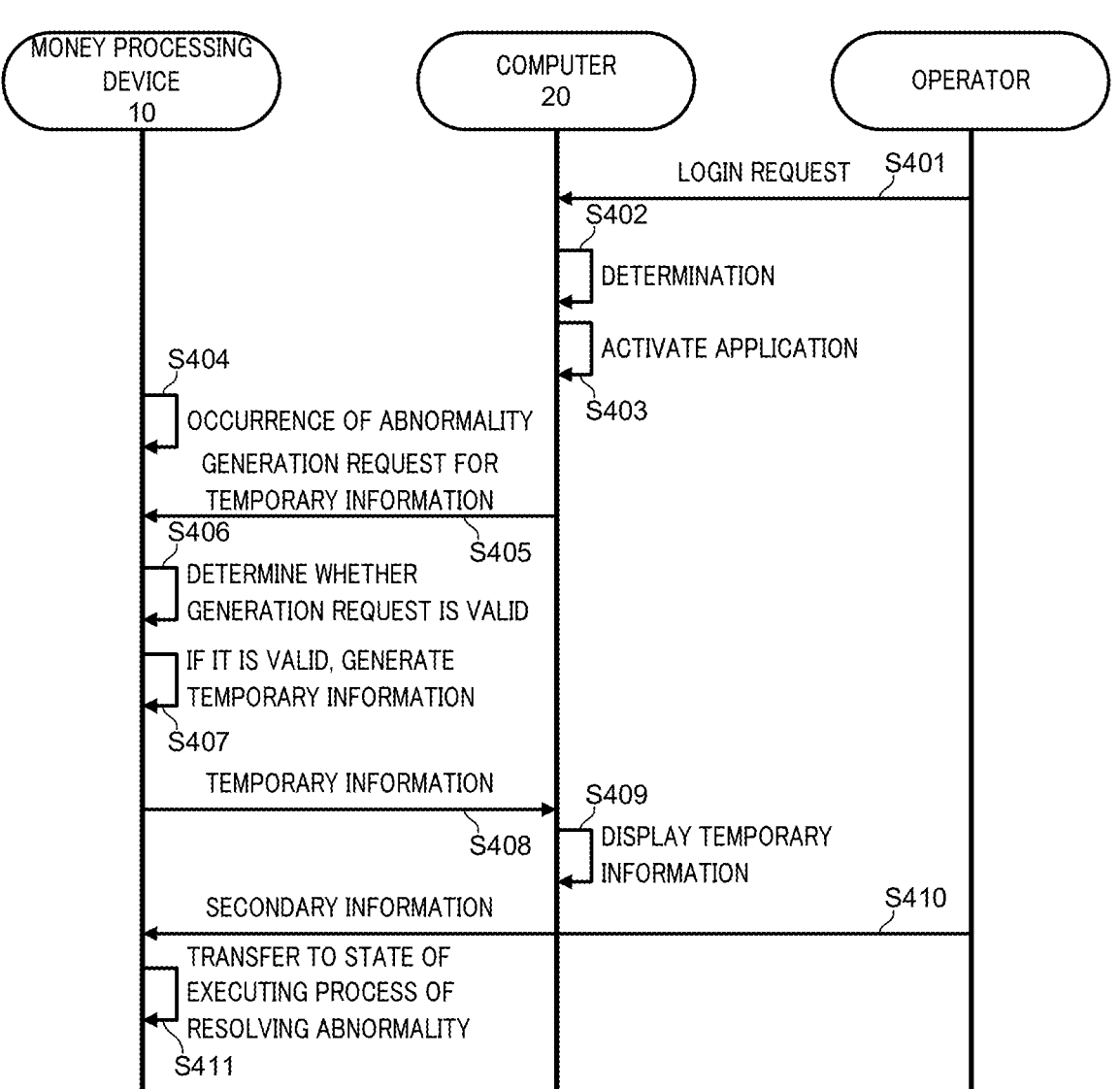
FIG. 6 is a sequence diagram illustrating another example of a method of resolving an abnormality of a money processing device according to Embodiment 2.

FIG. 6 is a sequence diagram illustrating another example of a method of resolving an abnormality of the money processing device 10 according to Embodiment 2.

The computer 20 is an actual control device of the money processing device 10 that provides various instructions related to money processing to the money processing device 10. The person who can activate the application used for providing various instructions related to money processing to the money processing device 10 by the computer 20 is limited to the person with a predetermined authority. Therefore, when the application is activated in the computer 20, the authentication of the user is performed.

More specifically, the operator of the computer 20 makes a login request to the computer 20 (S401). For example, a user ID and a password are input. The computer 20 that has received the login request determines whether the login request is valid (S402). Specifically, whether the operator has the authority to operate the money processing device 10, or in other words, whether the operator has the authority to make a request for generation of temporary information required for resolving the abnormality when an abnormality is caused at the money processing device 10, is determined.

When it is determined that the login request is valid, i.e., when it is determined that the user has the authority to transmit a request for generation of temporary information to the money processing device 10, the computer 20 activates the application used for providing various instructions related to money processing to the money processing device 10 (S403).

When an abnormality is caused at the money processing unit 11 (S404), the operator of the computer 20 operates the computer 20 to transmit a signal of a request for generation of temporary information. A signal of a request for generation of temporary information is generated by the application used for providing various instructions related to money processing to the money processing device 10 (i.e., the application activated at S40). Note that the application may generate a signal of a request for generation of temporary information regardless of the presence/absence of an abnormality of the money processing unit 11.

A request for generation of temporary information sent by the computer 20 is received by the communication unit 12 (S405).

The subsequent flow (S406 to S411) is the same as the flow (S303 to S308) of the processing method described above with reference to FIG. 5.

Note that the application that is activated by the computer 20 and generates a request for generation of temporary information may be a dedicated application for generating a request for generation of temporary information. In this case, the flow from the login request (S401) to the application activation (S403) may be provided after an abnormality is caused at the money processing device 10 (i.e., after S404).

With this abnormality resolving method, a situation where a person with no valid authority performs an operation of resolving the abnormality caused at the money processing device 10 can be more reliably prevented.

In addition, the computer 20 may be configured to activate an application that can be activated by only the administrator with a predetermined authority, and an application that can be activated by common workers with no predetermined authority. An application that can be activated by the administrator is an application that needs input of the user ID of the administrator at the activation. The control unit 14 may determine that the generation request is valid when a request for generation of temporary information is sent from an application that can be activated by the administrator. In this manner, the person who performs the operation of resolving the abnormality caused at the money processing device 10 can be exactly limited.

Modification 3 of Embodiment 2

Further, abnormalities caused in the money processing device 10 according to the present embodiment may be resolved in the following manner. In this case, the computer 20 is communicatively connected to the server 30 (see FIG. 3) installed separately from the money processing device 10 and the computer 20, in addition to the money processing device 10.

FIG. 7 is a sequence diagram illustrating another example of a method of resolving an abnormality of the money processing device 10 according to Embodiment 2.

The computer 20 is an actual control device of the money processing device 10 that provides various instructions related to money processing to the money processing device 10. The person who can activate the application used for providing various instructions related to money processing to the money processing device 10 by the computer 20 is limited to the person with a predetermined authority. Therefore, when the application is activated in the computer 20, the authentication of the user is performed. The process related to the authentication itself is performed at the server 30.

Specifically, the operator of the computer 20 makes a login request to the computer 20 (S501). At this time, user information, which is information related to the user, is input. For example, a user ID and a password are input. The computer 20 that has received the login request transmits the information input from the user, such as a user ID and a password, to the server 30 (S502). When the information input from the user is received, the server 30 determines whether the login request is valid (S503). That is, the determination whether the operator has the authority to operate the money processing device 10 is performed. In other words, whether the operator has the authority to activate the application is determined. Further, in other words, whether the operator has the authority to make a request for generation of temporary information required for resolving the abnormality when an abnormality is caused at the money processing device 10 is determined.

Thereafter, determination result is transmitted to the computer 20 from the server 30 (S504).

In the case where the determination result received from the server 30 means that the login request is valid, i.e., that the user has the authority to activate the application, or that the user has the authority to transmit a request for generation of temporary information to the money processing device 10, the computer 20 activates the application used for providing various instructions related to money processing to the money processing device 10 (S505).

The subsequent flow (S506 to S513) is the same as the flow (S404 to S411) in the processing method described above with reference to FIG. 6.

Note that the application that is activated at the computer 20 and generates a request for generation of temporary information may be a dedicated application for generating a request for generation of temporary information. In this case, the flow from the login request (S501) to the activation of the application (S505) may be performed after an abnormality is caused at the money processing device 10 (i.e., after S506).

With this method of resolving the abnormality, a situation where a person with no valid authority performs an operation of resolving the abnormality caused at the money processing device 10 can be more reliably prevented. In addition, in the case where a plurality of the computers 20 are used, the information related to the authority of the user can be collectively managed by one server 30 without separately managing it by each computer 20. Thus, the operation related to the increase, decrease, or change of the users with the authority can be easily completed by only one modifying operation at the server 30.

Modification 4 of Embodiment 2

Further, abnormalities caused in the money processing device 10 according to the present embodiment may be resolved in the following manner.

FIG. 8 is a sequence diagram illustrating another example of a method of resolving an abnormality of the money processing device 10 according to Embodiment 2.

When an abnormality is caused at the money processing unit 11 (S601), the communication unit 12 transmits an abnormality notification, which is information of notifying an occurrence of an abnormality, to the computer 20 (S602). The computer 20 that has received the abnormality notification provides a display of notifying the occurrence of an abnormality to the display 21, i.e., a display of abnormality information (S603). The operator of the computer 20 who has noticed the occurrence of abnormalities from the display of the display 21 operates the computer 20 to transmit a signal of a request for generation of temporary information. Note that the computer 20 may automatically transmit a signal of a request for generation of temporary information upon receiving the abnormality information.

The request for generation of temporary information sent by the computer 20 is received by the communication unit 12 (S604).

The subsequent flow (S605 to S610) is the same as the flow in the processing method described above with reference to FIG. 5 (S303 to S308).

With this abnormality resolving method, when an abnormality is caused at the money processing device 10, the operator of the computer 20 can quickly and reliably notice the occurrence of the abnormality. Thus, the operation of resolving the abnormality caused at the money processing device 10 can be quickly started.

Embodiment 3

FIG. 9 is a schematic view illustrating an internal structure of the money processing device 10 according to Embodiment 3. The money processing device 10 according to the present embodiment is a banknote recycler that processes a banknote as an example of money. In the following description, the front or forward is the side on which an inlet 211 and an outlet 221 described later are formed, and the rear or rearward is the side opposite to the front or forward. In addition, the description of configurations, operations or effects similar to those of each embodiment described above may be omitted.

The money processing device 10 according to the present embodiment processes banknotes. The money processing device 10 includes a processing unit 100 of the upper part, and a safe unit 500 of the lower part.

The processing unit 100 includes an upper housing 120, the man-machine interface 13 disposed outside the upper housing 120 and various elements disposed inside the upper housing 120. Inside the upper housing 120, a depositing unit 121, a dispensing unit 122, a rejection unit 123, a temporary storage unit 124, a recognition unit 125, an upper transport unit 141, the communication unit 12, the control unit 14, and a recording device 40 are disposed.

The safe unit 500 is composed of a safe housing 501. A plurality of storage devices 531 to 535, a lower transport unit 542 and a second lower transport unit 543 are disposed in the safe housing 501.

In the present embodiment, the money processing unit 11 is composed of a transport unit 140 described later, and components connected to the transport unit 140 and configured to handle banknotes.

The depositing unit 121 is a part to which banknotes to be deposited are input during a depositing process, for example. In addition, the depositing unit 121 may be a part where banknotes to be counted are placed during a counting process. The depositing unit 121 includes the inlet 211. In front of the upper housing 120, the inlet 211 opens upward. The operator inputs banknotes by hand to the depositing unit 121 through the inlet 211. The depositing unit 121 includes a mechanism for taking banknotes one by one into the money processing device 10.

The dispensing unit 122 is a part to which banknotes sent out from the storage devices 531 to 535 are transported during a dispensing process, for example. In addition, the dispensing unit 122 is used also as a part to which rejected banknotes generated during the depositing process are transported. In addition, the dispensing unit 122 is used also as a part to which normal banknotes counted during a counting process are transported. The dispensing unit 122 can hold a plurality of banknotes in a stacked state. The dispensing unit 122 includes the outlet 221. The outlet 221 opens upward at a position in front of the inlet 211. The operator can take out banknotes accumulated at the dispensing unit 122 by hand through the outlet 221.

The rejection unit 123 is a part to which rejected banknotes generated during a counting process are transported, for example. The rejection unit 123 is disposed at a front part in the upper housing 120. The rejection unit 123 is configured to hold a plurality of banknotes in a stacked state. The rejection unit 123 includes a second outlet 231. The second outlet 231 opens to the front side in front of the upper housing 120.

The temporary storage unit 124 temporarily stores banknotes to be deposited during a depositing process, for example. The temporary storage unit 124 can send out the stored banknotes. The temporary storage unit 124 is a tape type storage unit. The temporary storage unit 124 stores banknotes by winding the banknotes on the drum together with a tape.

The recognition unit 125 is disposed at a first transport path 411. The recognition unit 125 acquires at least the serial number of each banknote transported along the first transport path 411. In addition, the recognition unit 125 can recognize authentication, denomination and fitness.

The control unit 14 is a control device of the money processing device 10 and generally controls the money processing device 10. The recording device 40 records programs to be executed by the control unit 14. Note that the control unit 14 may generally control the money processing device 10 under the support of the computer 20 (see FIG. 3).

In the example illustrated in FIG. 9, the money processing device 10 includes five storage devices 531 to 535. In the following description, the five storage devices may be referred to as a first storage device 531, a second storage device 532, a third storage device 533, a fourth storage device 534, and a fifth storage device 535.

Each of the first storage device 531, the second storage device 532, and the third storage device 533 includes one storage unit S. Each of the fourth storage device 534 and the fifth storage device 535 includes two storage units (a first storage unit S1 and a second storage unit S2).

Each storage unit S, each first storage unit S1 and each second storage unit S2 includes a transport mechanism. The transport mechanism inputs the banknotes to the inside from the outside of the storage devices 531 to 535, and sends out the banknotes from the inside to the outside of the storage devices 531 to 535.

The upper transport unit 141, the lower transport unit 542 and the second lower transport unit 543 make up the transport unit 140. Inside the money processing device 10, the transport unit 140 transports the banknotes one by one with an appropriate interval between the banknotes.

The upper transport unit 141 includes the first transport path 411, a second transport path 412, a third transport path 413, a fourth transport path 414, a fifth transport path 415, a sixth transport path 416, a seventh transport path 417, and an eighth transport path 418.

Note that three transport paths are formed in the vertical direction through the upper wall that forms the safe housing 501. The three transport paths are disposed side by side in the front-rear direction. One of the three transport paths connects the sixth transport path 416 and a ninth transport path 421. Another transport path connects the seventh transport path 417 and a tenth transport path 422. Still another transport path connects the eighth transport path 418 and an eleventh transport path 420.

The first transport path 411 is configured in a loop shape. The transport unit 140 can transport banknotes in the clockwise direction and the counterclockwise direction in FIG. 1 along the first transport path 411.

The second transport path 412 connects the depositing unit 121 and the first transport path 411 to each other. The second transport path 412 transports banknotes from the depositing unit 121 toward the first transport path 411.

The third transport path 413 connects the dispensing unit 122 and the first transport path 411 to each other. The third transport path 413 transports banknotes from the first transport path 411 toward the dispensing unit 122.

The fourth transport path 414 connects the rejection unit 123 and the first transport path 411 to each other. The fourth transport path 414 transports banknotes from the first transport path 411 toward the rejection unit 123.

The fifth transport path 415 connects the temporary storage unit 124 and the first transport path 411 to each other. The fifth transport path 415 transports banknotes from the first transport path 411 toward the temporary storage unit 124, and from the temporary storage unit 124 toward the first transport path 411.

The sixth transport path 416 connects the lower transport unit 542 and the first transport path 411 to each other. The sixth transport path 416 transports banknotes from the first transport path 411 toward the lower transport unit 542, and from the lower transport unit 542 toward the first transport path 411.

The seventh transport path 417 connects the lower transport unit 542 and the first transport path 411 to each other. The seventh transport path 417 transports banknotes from the first transport path 411 toward the lower transport unit 542, and from the lower transport unit 542 toward the first transport path 411.

The lower transport unit 542 includes a ninth transport path 421, the tenth transport path 422, and the eleventh transport path 420.

The ninth transport path 421 connects the second lower transport unit 543 and the sixth transport path 416 to each other. The ninth transport path 421 transports banknotes from the sixth transport path 416 toward the second lower transport unit 543, and from the second lower transport unit 543 toward the sixth transport path 416.

The tenth transport path 422 connects the storage units S of the first storage device 531, the second storage device 532, and the third storage device 533, and the seventh transport path 417 to each other. The tenth transport path 422 transports banknotes from the seventh transport path 417 toward each of the storage devices 531 to 533, and from each of the storage devices 531 to 533 toward the seventh transport path 417.

The eleventh transport path 420 connects the first storage unit S1 of the fifth storage device 535 and the eighth transport path 418 to each other. The eleventh transport path 420 transports banknotes from the eighth transport path 418 toward the fifth storage device 535, and from the fifth storage device 535 toward the eighth transport path 418.

The second lower transport unit 543 has a diverter in a middle part, and is connected to the second storage unit S2 of the fourth storage device 534 and the second storage unit S2 of the fifth storage device 535. The second lower transport unit 543 transports banknotes from the first transport path 411 toward the second storage unit S2 of the fourth storage device 534, and from the second storage unit S2 toward the first transport path 411. In addition, the second lower transport unit 543 transports banknotes from the first transport path 411 toward the second storage unit S2 of the fifth storage device 535, and from the second storage unit S2 toward the first transport path 411.

Although not illustrated in the drawing, a passage sensor that detects a passage of a banknote is disposed in each unit of the transport unit 140. When the transport unit 140 receives a command from the control unit 14, the transport unit 140 transports a banknote to a predetermined transport destination on the basis of a detection signal of the passage sensor. In addition, on the basis of the recognition result of the recognition unit 125 and the detection signal of the passage sensor, the control unit 14 acquires the serial number of the banknote stored in each storage unit, and records the serial number in the recording device 40.

The man-machine interface 13 is installed in such a manner that it is easy to operate and see for the user of the money processing device 10, i.e., the person who deposits a banknote to the money processing device 10 and withdraws the banknote from the money processing device 10. More specifically, it is installed on the upper side of the upper housing 120 such that the touch panel faces forward, on the rear side than the depositing unit 121 and the dispensing unit 122.

The control unit 14 generates temporary information. The condition for generating the temporary information may be an occurrence of an abnormality in the money processing unit 11 provided in the money processing device 10 according to the present embodiment. In addition, the condition for generating the temporary information may be a reception of a request for generation of temporary information at the money processing device 10 from an external computer. In addition, the condition for generating the temporary information may be an output of abnormality information by the money processing device 10 to an external computer. Subsequently, the control unit 14 operates the communication unit 12 to provide the temporary information to the outside. Thereafter, when the man-machine interface 13 that has not operated to provide the temporary information to the outside receives the secondary information corresponding to the temporary information, the control unit 14 transfers the money processing device 10 to the state of executing the process of resolving the abnormality.

At this time, there is a possibility that a banknote may remain in the money processing unit 11. For example, there is a possibility that a banknote is present in the transport unit 140. The banknote remaining in the money processing unit 11 may hinder the operation of resolving the abnormality. For example, when a banknote is present between the eighth transport path 418 and the eleventh transport path 420, between the sixth transport path 416 and the ninth transport path 421, or between the seventh transport path 417 and the tenth transport path 422, the banknote may be damaged if the upper housing 120 is slid with respect to the safe housing 501 to resolve the abnormality. In view of this, the control unit 14 controls the money processing unit 11 to send the banknote remaining at the money processing unit 11 toward the dispensing unit 122 or the rejection unit 123 when the money processing device 10 executes the process of resolving the abnormality.

Thus, the worker who resolves the abnormality caused at the money processing unit 11 can smoothly perform the operation of resolving the abnormality without being hindered by the banknote remaining at the money processing unit 11. In addition, when the banknote is sent to the dispensing unit 122 or the rejection unit 123, a person authorized to make a request for generating temporary information, i.e., a person with a predetermined authority, is at a position in the vicinity of the money processing device 10, or more specifically, at a position where the man-machine interface 13 can be operated. Thus, the dispensed banknote can be safely collected and properly handled by the person with a predetermined authority.

In addition, when transferring the money processing device 10 to the state where the process of resolving the abnormality can be executed, the control unit 14 may display a guidance for resolving the abnormality on the man-machine interface 13. The guidance may be a sentence, a diagram, or a combination of a sentence and a diagram. The guidance may be provided with voice. In the case where it is a sentence, the sentence may be, for example, "The door is open, please close it", "there are banknotes stuck in the dispensing unit", or "Please open the unit and remove the banknotes". In addition, in the case where it is a diagram, it may be a still picture or a moving image that indicates the part to be operated. The operation required for resolving the abnormality may differ depending on the details of the portion and kind of the abnormality caused at the money processing unit 11. With the indication of the specific operation and order for resolving the abnormality on the man-machine interface 13, the worker can more smoothly perform the operation of resolving the abnormality.

Note that the process of resolving the abnormality may be provided in the following manner, for example.

When an abnormality is caused, a screen for inputting the one-time password is displayed on the man-machine interface 13. When a correct one-time password is input through the man-machine interface 13, a self-resolving button is displayed. When the self-resolving button is pushed, the control unit 14 operates the money processing unit 11 according to a predetermined procedure, and attempts to resolve the abnormality by itself. More specifically, the banknote located at the transport unit 140 is transported to the dispensing unit 122. The banknote in the temporary storage unit 124 may also be transported to the dispensing unit 122. The transport destination need not be the dispensing unit 122, and may be the rejection unit 123, for example. The transporting speed at this time may be lower than the transporting speed for the normal banknote processing. By reducing the transporting speed, the clogging banknote can be easily removed from the clogging portion, and clogging with the banknote being transported can be more reliably prevented. When it is detected that the banknote dispensed to the dispensing unit 122 and the like have been removed, the dispensing process is completed. Subsequently, the operation confirmation for the mechanical component of the money processing unit 11 such as the diverter mechanism provided in the transport unit 140 is performed, and the money processing unit 11 is set to the initial state. Subsequently, the abnormality state of the control unit 14 is resolved. Specifically, the abnormality code is cleared, and the display of the man-machine interface 13 is reset to the display of the normal state. At this time, a reconciliation process may be subsequently performed to settle the inventory amount in the money processing device 10.

In the case where the control unit 14 cannot resolve the abnormality by itself, the control unit 14 causes the man-machine interface 13 to display the guidance for the operation to be performed by the worker. The worker can manually perform the process of resolving the abnormality according to the guidance display. By finally pushing the self-resolving button again, the worker causes the money processing device 10 to perform the operation according to the predetermined procedure, and confirm that all abnormalities have been resolved. Through the above-described operation, the money processing device 10 is reset to the original state with the abnormality resolved.

The screen for inputting the one-time password and the guidance for resolving the abnormality are displayed on the man-machine interface 13. That is, the computer 20 connected with the money processing device 10 need not display the screen for inputting the one-time password and the guidance on the display 21. Thus, the computer 20 need not have programs (user interfaces) for displaying dedicated screens differing among the models of the money processing devices 10, for resolving the abnormality caused at the money processing device 10. In addition, the computer 20 need not have devices and programs (inter device interfaces) differing among the models of the money processing devices 10, for communication for resolving the abnormality between it and the money processing device 10. That is, the computer 20 can be connected to various money processing devices 10 in a cost-effective manner.

Embodiment 4

FIG. 10 is a diagram illustrating an example of an installation state of the money processing device 10 according to Embodiment 4. The money processing device 10 according to the present embodiment is the banknote recycler illustrated in FIG. 9, and is installed in a bank. The description of configurations, operations or effects similar to those of each embodiment described above may be omitted.

The money processing device 10 is disposed such that the rear part of the money processing device 10 is located on the lower side of the counter table 61. The computer 20 and the display 21 are placed on the counter table 61. That is, the computer 20 and the display 21 are disposed next to the money processing device 10. The display 21 is installed to face the side opposite to the man-machine interface 13, i.e., the rear side of the money processing device 10. In other words, the display 21 is installed such that the operator of the man-machine interface 13 cannot see the displayed content.

An operator 70 of the computer 20 is a bank clerk, and operates the computer 20 from the front side of the display 21.

Of the embodiments described above, applicable embodiments are applied singly or in combination to the system illustrated in FIG. 10. For example, it is assumed that an abnormality is caused at the money processing unit 11 when the money processing device 10 is operated by a customer of a bank. Then, a one-time password required for resolving the abnormality is displayed on the display 21. After seeing and remembering the one-time password displayed on the display 21, the operator 70 turns around the counter table 61 to move to the front side of the money processing device 10. Thereafter, the operator 70 inputs the remembered one-time password to the man-machine interface 13. When the correct one-time password is input, the control unit 14 transfers the money processing device 10 to the state of executing the process of resolving the abnormality.

The one-time password is a password that is effective for one time, i.e., temporary information. In this manner, even if the customer who has operated the money processing device 10 before the abnormality is caused sees the one-time password when the operation of inputting the one-time password to the man-machine interface 13 is performed, there is no problem since it cannot be used again.

In addition, the computer 20 is installed adjacent to the money processing device 10. In this manner, when an abnormality is caused at the money processing device 10, the operator 70 of the computer 20 can quickly start the operation of resolving the abnormality. Moreover, the display 21 is installed such that the displayed content cannot be seen from the operator (customer) of the man-machine interface 13. Thus, it is possible to prevent a situation where a customer of a bank sees the one-time password and performs the abnormality resolving operation by inputting the one-time password to the man-machine interface 13.

Embodiment 5

FIG. 11 is a diagram illustrating an example of an installation state of the money processing device 10 according to Embodiment 5. The description of configurations, operations or effects similar to those of each embodiment described above may be omitted.

The money processing device 10 is installed in a facility (a financial store or a distribution store) provided with a partition 62. With the partition 62, the inner space of the facility is partitioned into a first space and a second space. That is, the partition 62 is installed between the first space and the second space. For example, the first space is a front office where the customers of the facility enter, and the second space is a back office that does not expect the entry of the customers of the facility.

The money processing device 10 is installed in the first space. That is, the man-machine interface 13 is installed in the first space. In addition, the computer 20 and the display 21 are installed in the second space. Note that the computer 20 and the display 21 are placed on a desk 63. In addition, a through hole is formed in the partition 62, and the money processing device 10 may be disposed such that a part of the money processing device 10 is inserted into the through hole and that the man-machine interface 13 is located in the first space.

The partition 62 limits the free flow of a person between the first space and the second space. That is, the customers of the facility can enter the first space, but cannot enter the second space. On the other hand, the worker of the facility can enter both the first space and the second space. The partition 62 is, for example, a wall provided with a door that can be locked. The partition 62 is, for example, a counter table including a swing unit through which a person can pass in a swinging manner.

Since the man-machine interface 13 is located in the first space and the display 21 is located in the second space, the operator of the man-machine interface 13 cannot see the displayed content on the display 21.

Of the embodiments described above, applicable embodiments are applied singly or in combination to the system illustrated in FIG. 11. For example, it is assumed that an abnormality is caused in the money processing unit 11 when a customer of the facility is operating the money processing device 10. Then, the one-time password required for resolving the abnormality is displayed on the display 21. The operator 70 of the computer 20 who is the worker of the facility sees and remembers the one-time password displayed on the display 21, and then opens the door to move near the money processing device 10 through the partition 62, for example. Thereafter, the operator 70 inputs the remembered one-time password to the man-machine interface 13. When the correct one-time password is input, the control unit 14 transfers the money processing device 10 to the state of executing the process of resolving the abnormality.

The display 21 is installed such that the displayed content cannot be seen from the operator of the man-machine interface 13. Thus, it is possible to prevent a situation where the customers of the facility see the one-time password and input the one-time password to the man-machine interface 13 to perform the operation of resolving the abnormality.

Embodiment 6

FIG. 12 is a diagram illustrating an example of a relationship between the money processing device 10 and an information processing device installed outside the money processing device 10 according to Embodiment 6. The description of configurations, operations or effects similar to those of each embodiment described above may be omitted.

The money processing device 10 according to the present embodiment is configured such that the man-machine interface 13 provides, i.e., displays, the temporary information to the outside. In addition, the money processing device 10 according to the present embodiment is configured such that the communication unit 12 receives the secondary information.

The computer 20 is a transportable computer such as a tablet computer and a smartphone. The computer 20 is configured to communicably exchange information with the communication unit 12. The computer 20 includes a display (not illustrated in the drawing) and a camera 22. The computer 20 may be, for example, an actual control device of the money processing device 10 that provides various instructions related to money processing to the money processing device 10. In the case where the money processing device 10 is a money recycler installed in a financial store such as a bank, the computer 20 may be an operation terminal (so-called teller terminal) operated by a bank clerk.

In addition, in the case where the money processing device 10 is a change machine installed in a distribution store, the computer 20 may be a point of sales (POS) terminal operated by a salesclerk.

The server 30 has the same configuration as that described in the above-described embodiments.

FIG. 13 is a sequence diagram illustrating an example of a method of resolving an abnormality of the money processing device 10 according to Embodiment 6.

When an abnormality is caused at the money processing unit 11 (S701), the control unit 14 generates temporary information (S702). The generation of temporary information may be automatically performed, or may be performed in response to a generation request from the computer 20.

The control unit 14 operates the man-machine interface 13 such that it displays the generated temporary information to provide it to the information to the outside (S703). The temporary information may be letter information that can be read by a human. In addition, the temporary information may be displayed in the form of codes. For example, the temporary information is a two-dimensional code. The temporary information may be a bar code.

The computer 20 acquires the temporary information by capturing the image of the two-dimensional code displayed on the man-machine interface 13 in accordance with an operation by the operator of the computer 20 (e.g., a bank clerk or a salesclerk) (S704). The computer 20 generates the secondary information by decoding the acquired two-dimensional code (S705).

The computer 20 transmits the generated secondary information as electronic information, to the communication unit 12 through radio communication or wired communication. When the communication unit 12 receives the secondary information (S706), the control unit 14 transfers the money processing device 10 to the state of executing the process of resolving the abnormality (S707). The computer 20 or a communication application that operates in the computer 20 is limited to one that is preliminarily permitted to communicate with the money processing device 10. Alternatively, the operator who can operate the computer 20 is limited to a preliminarily permitted authorized person. Alternatively, the operator who can activate the communication application that operates in the computer 20 is limited to a preliminarily permitted authorized person.

The money processing device 10 according to the present embodiment is configured as described above, and the method of resolving an abnormality caused at the money processing device 10 is performed as described above. That is, to resolve an abnormality, it is necessary to capture the image of the temporary information displayed on the man-machine interface 13 with the computer 20 located outside the money processing device 10, and transmit the acquired temporary information to the communication unit 12. Here, since the computer 20 or the operator is limited to the preliminarily permitted person, only the operator of the computer 20 can perform the operation for resolving the abnormality. Thus, it is possible to prevent a situation where when an abnormality is caused at the money processing device 10, a person with no authority performs the operation of resolving the abnormality of the money processing device 10 and inconvenience is caused. Examples of a person with no authority may include customers in the facility where the money processing device 10 is installed, and workers in the facility with no authority to operate the computer 20 (e.g., a bank clerk or a salesclerk). In the case where the temporary information displayed on the man-machine interface 13 is coded information, it is possible to prevent a person with no authority from knowing the temporary information, and it is thus possible to more reliably ensure that only the operator of the computer 20 can perform the operation for resolving the abnormality.

Modification

It goes without saying that the money processing device, the method of resolving an abnormality of the money processing device and the computer program according to the present disclosure are not limited the above-described embodiments. Various combinations of matters described in detail in each embodiment are also included in the technical scope of the present disclosure.

For example, in the case where a transportable computer 20 is connected to the money processing device 10, the man-machine interface 13 may display temporary information after the communication unit 12 has received a request for generation of temporary information from the computer 20.

In addition, when determining whether the computer 20 or the application executed by the computer 20 has the authority to transmit a request for generation of temporary information, abnormality information that notifies an occurrence of an abnormality at the money processing unit 11 may be transmitted to the computer 20.

INDUSTRIAL APPLICABILITY

The present disclosure is applicable to a money processing device used in distribution, financial and other various industrial fields, an abnormality resolving method thereof, and a computer program used for them.

The invention claimed is:

1. A money processing device comprising:
a money processing unit including a depositing inlet to receive money and a dispensing outlet to dispense money;
communication circuitry;
a man-machine interface; and
processing circuitry configured to control the money processing unit, the communication circuitry, and the man-machine interface, wherein the processing circuitry is configured to
in response to an abnormality in the money processing device, transmit an abnormality notification to an external computer outside of the money processing device through the communication circuitry, the abnormality notification being information for notifying an occurrence of the abnormality,
receive a request for generation of temporary information from the external computer through the communication circuitry,
determine whether the request for generation is valid,
in response to the request for generation being valid, generate the temporary information, and operate the communication circuitry to provide the temporary information to the external computer, and
in response to the man-machine interface receiving secondary information corresponding to the temporary information, transfer the money processing device to a state of executing a process of resolving the abnormality, wherein the process of resolving the abnormality includes a process of dispensing money remaining inside the money processing unit to the dispensing outlet, the money remaining inside the money processing unit being money that remains in a transport path for transporting money.

2. The money processing device according to claim 1, wherein the processing circuitry is configured to transfer the money processing device to the state of executing the process of resolving the abnormality in response to the man-machine interface receiving a password as the secondary information.

3. The money processing device according to claim 2, wherein the temporary information is a one-time password; and the password is the one-time password.

4. The money processing device according to claim 2, wherein the temporary information is reference point designation information that designates a reference point of a variable password table prepared in advance; and the password is a variable password that is obtainable based on the variable password table and the reference point designation information.

5. A method of resolving an abnormality of a money processing device, the money processing device comprising a money processing unit including a depositing inlet to receive money and a dispensing outlet to dispense money, a communication circuitry communicatively connected to an external computer outside of the money processing device, a man-machine interface, and processing circuitry configured to control the money processing unit, the communication circuitry, and the man-machine interface, the method comprising:

transmitting, by the communication circuitry, an abnormality notification to the external computer in response to the abnormality being caused, the abnormality notification being information of notifying an occurrence of the abnormality;

receiving, by the communication circuitry, a request for generation of temporary information from the external computer;

determining, by the processing circuitry, whether the request for generation is valid;

generating, by the processing circuitry, the temporary information in response to the request for generation being valid;

operating, by the processing circuitry, the communication circuitry to provide the temporary information to the external computer;

receiving, by the man-machine interface, secondary information corresponding to the temporary information; and transferring, by the processing circuitry, the money processing device to a state of executing a process of resolving the abnormality, in response to the secondary information being received, wherein the process of resolving the abnormality includes a process of dispensing money remaining inside the money processing unit to the dispensing outlet, the money remaining inside the money processing unit being money that remains in a transport path for transporting money.

6. The method according to claim 5, further comprising:

determining, by the external computer, whether a user of the external computer has an authority to transmit the request for generation; and activating, by the external computer, an application used for transmitting the request for generation to the communication circuitry.

7. The method according to claim 5, further comprising:

transmitting, by the external computer, user information to a server that manages data for authentication of the user of the external computer, the user information being information related to the user;

determining, by the server, whether the user has an authority to transmit the request for generation, based on the user information;

transmitting, by the server, a determination result to the external computer; and activating by the external computer, an application used for transmitting the generation request to the money processing device, in response to a determination that the user bas the authority to transmit the request for generation.

8. The method according to claim 5, wherein the external computer is installed adjacent to the money processing device; and the external computer comprises a display that is installed such that a displayed content is not seen from an operator of the man-machine interface.

9. The method according to claim 5, wherein the external computer comprises a display;

the man-machine interface is installed in a first space;

the display is installed in a second space adjacent to the first space; and a partition configured to limit free flow of a person is installed between the first space and the second space.

10. A non-transitory computer-readable storage medium storing a program thereon which, when executed by a money processing device including a money processing unit including a depositing inlet to receive money and a dispensing outlet to dispense money, causes the money processing device to perform a method, the method comprising:

transmitting, by communication circuitry, an abnormality notification to an external computer in response to the abnormality being caused, the abnormality notification being information of notifying an occurrence of the abnormality;

receiving, by the communication circuitry, a request for generation of temporary information from the external computer;

determining, by the processing circuitry, whether the request for generation is valid;

generating, by the processing circuitry, temporary information in response to a determination that the request for generation is valid;

operating, by the processing circuitry, the communication circuitry to provide the temporary information to the external computer;

receiving, by a man-machine interface, secondary information corresponding to the temporary information; and transferring, by the processing circuitry, the money processing device to a state of executing a process of resolving the abnormality, in response to the man-machine interface receiving the secondary information, wherein the process of resolving the abnormality includes a process of dispensing money remaining inside the money processing unit to the dispensing outlet, the money remaining inside the money processing unit being money that remains in a transport path for transporting money.

\* \* \* \* \*